April 21, 1959   A. W. CHURCHILL ET AL   2,882,929
PILOT-OPERATED THREE-WAY DIVERSION VALVE
Filed Aug. 20, 1956
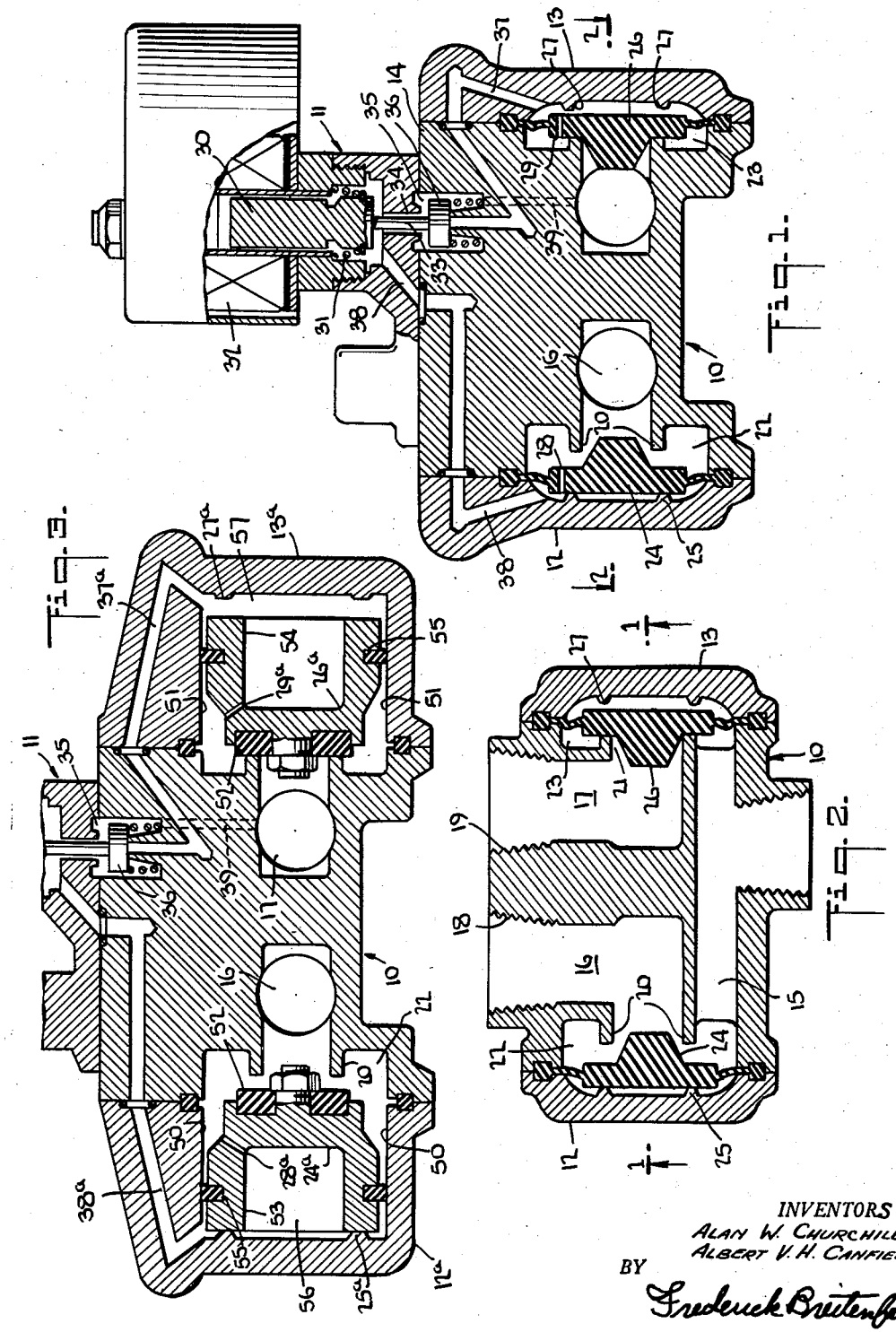
INVENTORS
ALAN W. CHURCHILL
ALBERT V. H. CANFIELD
BY
Frederick Breitenfeld
ATTORNEY United States Patent Office 2,882,929
Patented Apr. 21, 1959

2,882,929

PILOT-OPERATED THREE-WAY DIVERSION VALVE

Alan W. Churchill, Caldwell, and Albert V. H. Canfield, Cedar Grove, N.J., assignors to Automatic Switch Co., Orange, N.J., a corporation of New York Application August 20, 1956, Serial No. 605,103

4 Claims. (Cl. 137—609)

This invention relates generally to valves, and has particular reference to valves in which the opening and closing of ports in a main body are controlled by a pilot valve, preferably solenoid operated.

The invention relates more particularly to a three-way valve intended for flow diversion service. Fluid entering a valve of this kind through an inlet chamber is caused to flow out of one or the other of alternative outlet chambers depending upon the settings of two valves on their respective valve seats.

It is a general object of the invention to provide an improved valve construction of this character in which a single three-way pilot valve is adapted to control the operation, and in which the valve as a whole is relatively small and compact, capable of economical manufacture, and reliable in operation at low cost and with a minimum of maintenance attention. These advantages are achieved while still maintaining the main valve openings of relatively large size.

The valve construction is of such design that overall symmetry and compactness may be readily attained. It lends itself to the optional employment of piston valves or diaphragm valves as the operative movable parts of the main valve body. Where diaphragm valves are used, the foregoing general advantages may be coupled with the added ability to assemble the valve parts without packing whereby the valve is operable for long periods of time at low operating and maintenance cost.

The desirable objectives of the invention are achieved, in part, by the special manner in which the chambers of the main valve body are arranged with respect to one another, by the way in which openable and closable valve seats are formed between the inlet chamber and the two outlet chambers respectively, and the manner in which the ports of the pilot valve are connected to the various chambers of the main valve body and to the regions behind the valve elements. These various features of the construction function cooperatively so that the actuation of the pilot always causes one of the valves in the main body to open and the other to close. One of the novel features of the invention resides in the means whereby this mode of functioning is attained, and whereby the seating and unseating of the valves in the main valve body is caused to be speedy and reliable.

We achieve the foregoing objectives, and such other objects and advantages as may hereinafter appear or be pointed out, in the manner illustratively exemplified in the accompanying drawings, in which—

Figure 1 is a cross-sectional view of a valve construction embodying the features of this invention, with the pilot valve in one of its settings and the valve openings of the main valve body in correspondingly open and closed condition respectively, this view being taken substantially along the line 1—1 of Figure 2;

Figure 2 is a cross-sectional view substantially along the line 2—2 of Figure 1; and Figure 3 is a view similar to Figure 1, showing how the opposite end sections of the main body may be modified to permit employment of piston-type valve elements instead of diaphragm valves.

The invention is applicable to valves of varying sizes and capacities, and for purposes of illustration we have shown in Figures 1 and 2 a main valve body 10 having a length of approximately 4 inches, the pilot valve body 11 being of corresponding dimensions. The valve body 10 may be formed and assembled, and the pilot valve body secured thereto, in any of various ways. We have illustratively shown a construction in which a pair of substantially parallel opposite end walls 12 and 13 are separately formed, then secured to the medial part of the body by appropriate studs or the like (not shown). The body 10 may be provided with a flat face 14 adapted to be brought into abutting relation to a similar flat face, on the pilot valve body 11, these parts being held together by studs or similar expedients.

The interior of the main valve body 10 is provided with partitions defining an inlet chamber 15, a first outlet chamber 17, and a second or alternate outlet chamber 16. In the construction illustrated the connection openings 18 and 19, leading to the chambers 16 and 17 respectively, lie side by side and face in the same direction, but this is not essential and under certain circumstances they may be arranged otherwise, e.g., one connection opening may face in one direction and the other in the opposite direction. All the openings are preferably interiorly threaded, as shown, to facilitate the installation of the valve in the fluid lines to be controlled.

The partition walls within the valve body are so designed that they define a substantially circular valve seat 20 facing the end wall 12 and a similar seat 21 facing the opposite end wall 13. For purposes of symmetry and compactness these valve seats are thus arranged in opposed relation with their axes in alignment, but this is not essential in all cases.

The valve seat 21 surrounds a space that communicates with the first outlet chamber 17, and is surrounded by an annular space 23 that communicates with the inlet chamber 15. Similarly, the valve seat 20 surrounds a space leading to the alternate outlet chamber 16 and is surrounded by an annular space 22 that also communicates with the inlet chamber 15.

In Figures 1 and 2 we have shown each of the valve seats 20 and 21 provided with a diaphragm valve mounted in axial relation for seating and unseating with respect to the valve seat. The diaphragm valve element 24 is secured peripherally to the valve body 10 beneath the end wall 12 so that it may move from the unseated position shown to a seated position on the valve seat 20. The anchored periphery of the valve 24 lies radially beyond the annular space 22, whereby the marginal part of the valve constitutes an annular barrier between the space 22 and the region behind the valve. The inner face of the end wall 12 is provided with raised parts 25 serving as abutments to limit the opening movement of the valve 24, thus limiting the contraction in volume of the region behind the valve when the valve moves from its seated to its unseated position.

There is a similar diaphragm valve 26 mounted in association with the valve seat 21 and movable in similar fashion between the seated position shown and an unseated position in which it abuts raised parts 27 on the end wall 13.

Each of the valves 24 and 26 is provided with a bleed opening. The bleed hole 28 near the periphery of the valve 24 establishes communication with the annular space 22, hence with the inlet chamber 15. In a similar relative position the valve 26 is provided with a bleed hole 29.

The pilot valve is of a type known per se, and includes a solenoid core 30 shiftable through a short axial distance in response to a spring 31 and to energization and deenergization of the solenoid by means of the usual coils 32. The core 30 is provided with an extension 33 which passes loosely through a bore 34 into a pilot valve chamber 35. This chamber has opposed aligned ports, one at the top (as viewed in Figure 1), one at the bottom. The extension 33 carries a valve element 36 which seats itself against one or the other of these ports depending upon the setting of the solenoid core 30. In Figure 1 the pilot valve element 36 is in its lower position thus sealing off the port at the bottom and uncovering the port at the top. In the construction shown this is the position assumed by the solenoid core when the solenoid is inactivated, but this relationship is not essential, and under certain circumstances to deenergization of the solenoid might be caused to move the solenoid core into the opposite setting.

The pilot valve chamber 35 is formed, in the valve illustrated, by a recess in the main valve body 10, but this is merely a matter of manufacturing convenience, and since the pilot valve element 36 operates in this chamber it has been referred to as a pilot valve chamber.

In the valve bodies passages are provided to define various special communications between the pilot valve chamber 35 and portions of the main valve body. One such communication is indicated at 37 and leads from the region behind the valve 26 to the lower port of the pilot valve chamber. Another communication 38 extends from the region behind the valve 24 to the opposite or upper port of the pilot valve chamber. One or the other of these communications is sealed off in each setting of the pilot valve. A third communication, constantly open and not subject to obstruction at any time by movements of the solenoid core 30, is the passage 39 extending from the chamber 35 to the first outlet chamber 17.

In the setting shown in Figures 1 and 2, the passage 37 is sealed off, hence the incoming fluid leaking rearwardly through the hole 29 is trapped in the region behind the valve 26, and the accumulation of this fluid causes the valve 26 to move into and remain in the seated position on the valve seat 21. At the same time, the uncovered condition of the upper port in the pilot valve chamber 35 allows free flow of fluid from behind the valve 24 through passages 38 and 34, chamber 35 and passage 39 to the outlet chamber 17. The passage 39 is larger than each of the bleed holes 28, 29, as a result of which the flow of fluid in the direction described is at a greater rate than the leakage of incoming fluid rearwardly through the bleed hole 28, hence the valve 24 is moved into and remains in the unseated position.

With parts in this setting, fluid entering the valve through the inlet chamber 15 is diverted to the second outlet chamber 16. Upon actuation of the solenoid to shift the pilot valve element 36 into the other setting in which the upper port is sealed off and the lower port uncovered, the reverse action takes place, i.e., fluid builds up in the closed-off space behind the valve 24 thereby seating that valve, and fluid escapes from behind the valve 26 into outlet chamber 17 thereby unseating that valve. As a result, the main fluid flow is through the first outlet chamber 17.

The shifting of the various parts from one setting to the other, and back again, can be achieved with great rapidity and reliability, with a minimum of wear and tear, and at low cost.

In Figure 3 we have indicated the manner in which many of the advantages of the invention, other than those directly attributable to the use of diaphragm valves, may be achieved in a construction in which piston valves are used instead of diaphragm valves. Since the main valve body, except for its opposite end walls, and the pilot valve body, are the same as in Figures 1 and 2, the same reference numerals are employed to designate the valve body as a whole (10), the pilot valve body 11, the first outlet chamber 17, the alternate outlet chamber 16, the valve seat 20 and the annular space 22 around it, the valve seat 21 and the annular space 23 around it, the pilot valve chamber 35 and the valve element 36 in it, and the permanently open communication 39. The inlet chamber is not visible in Figure 3, but as hereinbefore described it is in permanent communication with the annular spaces 22 and 23.

The end walls 12a and 13a of the main valve body 10 are of slightly modified shape to define cylindrical bores 50 and 51 within which piston valve elements 24a and 26a reciprocate. In each valve, the area that comes into contact with the valve seat may be composed of suitable non-metallic material, if desired, as exemplified by the ring-like elements 52 held in position by appropriate means. The rearwardly extending parts of the pistons form skirts 53 and 54, each provided with a piston ring 55. Each skirt and its piston ring constitutes an annular barrier between the region behind the valve and the corresponding annular space surrounding the valve seat. Skirt 53 with its piston ring separate the annular space 22 from the region 56 behind the valve, and skirt 54 with its piston ring constitute a fluid barrier between the annular space 23 and the space 57 behind the valve. However, a bleed hole 28a in the valve 24a establishes a restricted but constant communication between the spaces 22 and 56, and the bleed hole 29a in the valve 26a performs a corresponding function. Each of the holes 28a and 29a is smaller than the passage 39. Projections 25a on the wall 12a, and 27a on the opposite wall 13a, limit the unseating movements of the valves.

As hereinbefore described, the end walls 12a and 13a may be secured to the main valve body 10 by studs (not shown) or equivalent fasteners, and in all cases (Figures 1 and 3) it is preferable to employ appropriate O-rings or similar known expedients wherever they may be considered desirable or necessary to establish fluid-tight connections.

The functioning of the valve structure of Figure 3 is the same as that of Figures 1 and 2. There is a communication 37a between the region 57 and one of the pilot valve ports, and a similar communication 38a between the region 56 and the opposed pilot valve port. In each setting of the pilot valve one of these communications is sealed off, allowing fluid to accumulate in the region behind the corresponding valve, while the other passage is opened, allowing escape of fluid from the region behind the other valve, via passage 39, to the first outlet chamber 17.

It is to be understood that many of the details herein described and illustrated may be modified by those skilled in the art without necessarily departing from the spirit and scope of the invention as expressed in the appended claims.

What we claim is:

1. In a pilot-operated three-way diversion valve, a main valve body provided with partitions defining an inlet chamber, a first outlet chamber, and an alternate outlet chamber; a first valve seat between the inlet chamber and the first outlet chamber, said valve seat surrounding a space that communicates with said first outlet chamber and being surrounded by an annular space that communicates with the inlet chamber; a first valve mounted to seat and unseat on said first valve seat and having a part forming an annular barrier between said annular space and the region behind the valve; a second valve seat between the inlet chamber and the alternate outlet chamber, said valve seat surrounding a space that communicates with said alternate outlet chamber and being surrounded by an annular space that communicates with the inlet chamber; a second valve mounted to seat and unseat on said second valve seat and having a part forming an annular barrier between said annular space and the region behind the valve; a pilot valve body provided with opposed ports and a reciprocable valve element adapted in each setting to close one of said ports and uncover the other; a communication between one of said ports and the region behind said first valve, a communication between the other of said ports and the region behind said second valve, and a constantly open communication between the interior of the pilot valve body and said first outlet chamber; said first and second valves being each provided with a bleed hole establishing constant communication between the region behind the valve and the annular space around its valve seat; whereby the pilot valve in each setting causes incoming fluid to accumulate in the region behind one of said valves, thereby seating said valve, and allows flow of fluid from the region behind the other valve, thereby unseating said valve.

2. In a valve of the character described, the structure defined in claim 1, in which said first and second valves are arranged in opposed relation with their axes in alignment, the main valve body being provided with substantially parallel opposite end walls toward which the valves move when they unseat, each end wall having raised abutments to limit the movement of the valve adjacent to it and thereby limit the contraction in volume of the region behind the valve.

3. In a valve of the character described, the structure defined in claim 1 in which each of said first and second valves is a diaphragm valve whose anchored periphery lies radially beyond the annular space surrounding the valve seat.

4. In a valve of the character described, the structure defined in claim 1 in which each of said first and second valves is a piston valve, the main valve body being provided with cylindrical bores within which said piston valves reciprocate.

References Cited in the file of this patent
UNITED STATES PATENTS

| | | |
|---|---|---|
| 828,086 | Bowers | Aug. 7, 1906 |
| 914,886 | Schreidt | Mar. 9, 1909 |
| 1,873,181 | Brown | Aug. 23, 1932 |
| 2,569,881 | Davies | Oct. 2, 1951 |
| 2,617,444 | Gardner | Nov. 11, 1952 |
| 2,635,635 | Eimermann | Apr. 21, 1953 |
| 2,755,058 | Margrave | July 17, 1956 |

FOREIGN PATENTS

| | | |
|---|---|---|
| 87,392 | Sweden | Sept. 15, 1932 |